United States Patent
Holicki (10) Patent No.: US 12,305,991 B2
(45) Date of Patent: May 20, 2025

(54) METHOD AND DEVICE FOR DETERMINING A POSITION OF A VEHICLE IN A ROAD NETWORK

(71) Applicant: CARIAD SE, Wolfsburg (DE)

(72) Inventor: Michael Holicki, Berlin (DE)

(73) Assignee: CARIAD SE, Wolfsburg (DE)

(*) Notice: Subject to any disclaimer, the term of this patent is extended or adjusted under 35 U.S.C. 154(b) by 248 days.

(21) Appl. No.: 17/998,143

(22) PCT Filed: May 4, 2021

(86) PCT No.: PCT/EP2021/061728
§ 371 (c)(1),
(2) Date: Nov. 7, 2022

(87) PCT Pub. No.: WO2021/224258
PCT Pub. Date: Nov. 11, 2021

(65) Prior Publication Data
US 2023/0288210 A1    Sep. 14, 2023

(30) Foreign Application Priority Data
May 8, 2020    (DE) ...................... 10 2020 112 482.1

(51) Int. Cl.
*G01C 21/28* (2006.01)

(52) U.S. Cl.
CPC .................................... *G01C 21/28* (2013.01)

(58) Field of Classification Search
CPC .... G01C 21/28; G01C 21/30; G01C 21/3602; G01S 19/14; G01S 19/393; G01S 19/485; G01S 19/50
See application file for complete search history.

(56) References Cited

U.S. PATENT DOCUMENTS

| | | | | |
|---|---|---|---|---|
| 5,493,294 A | * | 2/1996 | Morita | .................... G01S 19/50 |
| | | | | 701/470 |
| 5,552,990 A | * | 9/1996 | Ihara | ...................... G01C 21/30 |
| | | | | 340/995.22 |

(Continued)

FOREIGN PATENT DOCUMENTS

| | | |
|---|---|---|
| DE | 69017494 T2 | 11/1995 |
| DE | 102010007091 A1 | 8/2011 |

(Continued)

OTHER PUBLICATIONS

Aly et al. "LaneQuest: An Accurate and Energy-Efficient Lane Detection System", arXiv:1502.03038v1, Feb. 10, 2015 (10 pages).

(Continued)

*Primary Examiner* — Tyler J Lee
(74) *Attorney, Agent, or Firm* — Seed IP Law Group LLP (57) ABSTRACT

A method is described in which a position of a vehicle is determined in a road network, having a plurality of edges, each of them being associated with a road section or a driving lane on a road section, by means of a sensor group of the vehicle, wherein first sensor data are detected by means of the sensor group, on the basis of the first sensor data each edge of a plurality of first edges of the road network is associated with a first probability that the vehicle is located in the road section associated with the first edge or in the driving lane associated with the first edge, second sensor data are detected by means of the sensor group, on the basis of the second sensor data and the probabilities associated with the first edges, a second probability is associated with each edge of a plurality of second edges of the road network that the vehicle is located in the road section associated with the second edge or in the driving lane associated with the second edge, and the second edge with (Continued)

the highest associated probability is determined to be the position of the vehicle.

15 Claims, 7 Drawing Sheets

(56) References Cited

U.S. PATENT DOCUMENTS

| | | | | |
|---|---|---|---|---|
| 6,167,347 | A * | 12/2000 | Lin | G01S 19/26 |
| | | | | 701/472 |
| 6,192,312 | B1 * | 2/2001 | Hummelsheim | G01C 21/30 |
| | | | | 340/988 |
| 6,317,683 | B1 | 11/2001 | Ciprian et al. | |
| 6,615,135 | B2 * | 9/2003 | Davies | G01S 5/011 |
| | | | | 342/357.31 |
| 8,032,299 | B2 * | 10/2011 | Fernandez Hernandez | |
| | | | | G01C 21/30 |
| | | | | 701/436 |
| 9,428,187 | B2 * | 8/2016 | Lee | B60W 30/12 |
| 2017/0350712 | A1 * | 12/2017 | Tateishi | G01C 21/3602 |
| 2018/0095474 | A1 * | 4/2018 | Batur | G01S 13/867 |
| 2020/0098135 | A1 | 3/2020 | Ganjineh et al. | |
| 2020/0249038 | A1 * | 8/2020 | Nashed | G06F 18/295 |
| 2020/0309541 | A1 * | 10/2020 | Lavy | G06V 20/588 |

FOREIGN PATENT DOCUMENTS

| | | |
|---|---|---|
| DE | 102016214028 A1 | 2/2018 |
| WO | 2017/021473 A1 | 2/2017 |

OTHER PUBLICATIONS

Zhang, M., "Methods and Implementations of Road-Network Matching", Dissertation, Technical University of Munich, 2009 (149 pages).

* cited by examiner

METHOD AND DEVICE FOR DETERMINING A POSITION OF A VEHICLE IN A ROAD NETWORK

BACKGROUND

Technical Field

The invention relates to a method for determining a position of a vehicle in a road network by means of a sensor group of the vehicle. The invention moreover relates to a device for determining a position of a vehicle in a road network by means of a sensor group of the vehicle.

Description of the Related Art

In the field of autonomous driving and also in the case of driver assist systems or navigation systems, the position of a vehicle has to be determined. In particular, in systems for autonomous driving, but also in driver assist systems and navigation systems, the determination of the position must be done with high accuracy in order to assure a high functional safety of the system. The accuracy of the position determination depends substantially on the quality of the sensor data, forming the basis of the position determination. Inaccurate sensor data may lead to inaccurate or even wrong position determination with catastrophic consequences. It is therefore desirable to carry out the most accurate possible position determination even with imprecise sensor data.

The document Aly et al.: LaneQuest. An Accurate and Energy-Efficient Lane Detection System, preprint, arXiv: 1502.03038v1, discloses a method for determination of a driving lane of a vehicle by means of a sensor group of the vehicle. Moreover, the document Zhang, M.: Methods and Implementations of Road-Network Matching. Dissertation, Technical University of Munich, 2009, discloses a method for comparing of road maps in particular by means of semantic methods.

BRIEF SUMMARY

The problem which the invention proposes to solve is to indicate a method and a device for determining a position of a vehicle which allow a determination of the position even with imprecise sensor data.

This problem is solved by a method having the features of claim 1 and by a device having the features of the independent device claim. Advantageous modifications are indicated in the dependent claims.

In the method according to claim 1, a position of a vehicle is determined in a road network, having a plurality of edges, each of them being associated with a road section or a driving lane on a road section, by means of a sensor group of the vehicle.

First sensor data are detected by means of the sensor group. On the basis of the first sensor data each edge of a plurality of first edges of the road network is associated with a first probability that the vehicle is located in the road section associated with the first edge or in the driving lane associated with the first edge. Second sensor data are detected by means of the sensor group. On the basis of the second sensor data and the probabilities associated with the first edges, a second probability is associated with each edge of a plurality of second edges of the road network that the vehicle is located in the road section associated with the second edge or in the driving lane associated with the second edge. The second edge with the highest associated probability is determined to be the position of the vehicle.

The road network is a graph whose edges correspond each time to a road section or each time to a driving lane on a road section. The road sections are for example sections of a road between two intersections, i.e., places at which the road crosses at least one other road or merges with it, or between an intersection and a place where the road terminates. Preferably, however, the road sections are chosen to be shorter, for example, as sections with a fixed length. The road sections can be associated with various attributes such as number of driving lanes, direction of travel, orientation points, landmarks, street name, and so forth.

In one advantageous modification, the edges are associated directly with a driving lane on a road section. This is possible, for example, when a rather detailed map is available.

The sensor group comprises at least one sensor of the vehicle. The registering of the first sensor data and the second sensor data may occur in succession in time. If the sensor group comprises more than one sensor, the registering of the first sensor data and the second sensor data can also take place at the same time. The plurality of second edges is in particular a subset of the plurality of first edges.

The plurality of second edges can also include edges which are not contained in the plurality of first edges.

On the basis of the first sensor data, a rough position determination of the vehicle within the road network is performed by assigning to each first edge a first probability that the vehicle is located in the road section associated with the first edge. The first probabilities together with the second probabilities serve as a basis for determining the second probabilities. In this way, the position determination within the road network is refined and/or updated by means of the second sensor data.

Since the determination of the position of the vehicle occurs within a road network having a rather high degree of abstraction, such as a global coordinate system, the method can deal with imprecise sensor data much better than other methods, such as those which determine a position of the vehicle within the global coordinate system. Since the method determines a probability distribution of all possible positions of the vehicle in the road network, it is always possible to ascertain a measure of how reliable the currently determined position is. Moreover, the method allows an ambiguous position determination, i.e., a position determination in which two or more edges are assigned the same or relatively the same probability.

Of course, the registering of the second sensor data and the determining of the second probabilities can be repeated in successive steps in time. In particular, the second probabilities determined in a first step can be used as the first probabilities in a following second step as the basis for determining further second probabilities. In other words: the second probabilities in the second step are determined on the basis of the second probabilities as determined in the first step and the second sensor data as registered in the second step. Hence, there is a recursive refinement of the position determination within the road network.

The method according to claim 1 can be carried out in particular in combination with a method for metric position determination, i.e., a determination of the position of the vehicle in a coordinate system, such as a global coordinate systems. The two methods are based on different functional modes and thus complement each other. In this way, the functional safety of a system for determination of the position of the vehicle can be substantially improved.

In one advantageous modification, a sensor coordinate of the vehicle is detected by means of a receiver for a signal of a satellite navigation system of the sensor group in a global coordinate system as at least part of the first sensor data and/or at least part of the second sensor data. In particular, the receiver may be a GPS antenna. With the aid of the satellite navigation system, the position of the vehicle can be determined accurately to within a few meters. This is often enough to narrow down the position of the vehicle to a few edges of the road network. Moreover, a direction of travel of the vehicle can be determined by means of the satellite navigation system. Alternatively or additionally, the direction of travel of the vehicle can be determined by means of odometry data.

Alternatively or additionally, the sensor coordinate of the vehicle can be detected by means of a receiver for a mobile radio signal of the sensor group. Especially in regions with a high density of mobile radio antennas, a position determination by means of a mobile radio signal is often more precise than a position determination by means of a satellite navigation system.

In another advantageous modification, each edge of the road network is associated with a coordinate of the respectively associated road section in the global coordinate system. The first probabilities are determined by comparing the sensor coordinate of the vehicle with at least a portion of the coordinates associated respectively with the first edges. For example, each first edge is assigned a first probability in dependence on the distance of the coordinate associated with the respective first edges from the sensor coordinate. The more distant the coordinate associated with the first edge from the sensor coordinate, the lower the first probability associated with the first edge. In particular, it can be assumed that the probability distribution of the actual coordinate of the vehicle in the global coordinate system is a normal distribution about the sensor coordinate. This makes it possible to quickly narrow down the position of the vehicle within the road network to a few edges and thereby limit the expense in the determination of the second probabilities.

In another advantageous modification, image data are detected by means of a camera of the sensor group as at least part of the first sensor data and/or at least part of the second sensor data. The image data correspond to an image of a detection region in front of or behind the vehicle. A multitude of qualitative data can be obtained from the image data, allowing a precise determination of the position of the vehicle. Since the method according to the invention functions with imprecise sensor data, the camera in particular need not be calibrated.

In another advantageous modification, an orientation point is associated each time with at least one subset of the edges of the road network. On the basis of the image data and making use of an object recognition method, it is determined whether an orientation point is present in the detection region of the camera. If an orientation point is present in the detection region of the camera, the first probabilities are also determined on the basis of the orientation point. The presence (or the absence) of an orientation point is an example of qualitative data enabling a precise determination of the position of the vehicle. For example, if a bridge is visible in the detection region of the camera, all first edges having a bridge associated with them as an orientation point are assigned a higher first probability than first edges not having any bridge associated with them as an orientation point. In particular, it is immaterial exactly where in the detection region of the camera the bridge is positioned. Alternatively or additionally, other known landmarks can also serve as orientation points, especially traffic lights, traffic signs, or traffic signs indicating a junction.

In another advantageous modification, a street name is associated each time with at least one subset of the edges of the road network. On the basis of the image data and making use of a text recognition method, it is determined whether a street name or a portion of a street name is present in the image of the detection region. If a street name or a portion of a street name is present in the image of the detection region, the first probabilities are also determined on the basis of the street name or a portion of a street name. Street names are a further example of qualitative data enabling a precise determination of the position of the vehicle. If a street name or a portion of a street name is recognized, the position of the vehicle can often be confined to a single street.

In another advantageous modification, at least a portion of the second sensor data are detected by means of the image data/egomotion data of the vehicle. By egomotion is meant in the present application the movement of a vehicle in a three-dimensional space. Accordingly, by egomotion data is meant motion data of the vehicle or the camera firmly connected to the vehicle, which are determined on the basis of the image data registered by the camera. Such motion data can be determined for example with image processing methods based on optical flow.

In another advantageous modification, odometry data of the vehicle is registered by means of the sensor group as at least part of the first sensor data and/or at least part of the second sensor data. By means of odometry data, or distance metering data, the present position of the vehicle can be determined from a known position of the vehicle in the past. Thus, odometry data allows a very accurate determination of the position of the vehicle, especially in the case of a repeated determination of the second probabilities.

In another advantageous modification, the road network contains a plurality of nodes, each time being associated with a junction between at least two road sections or between at least two driving lanes. Nodes associated with a junction between three or more road sections or between three or more driving lanes are called intersections. On the basis of the first sensor data or the second sensor data it is determined whether the vehicle is located in a road section or in a driving lane bordering on an intersection, or whether the vehicle is located in a road section or in a driving lane not bordering on an intersection. The first probabilities and the second probabilities are also determined on the basis of this information. This embodiment uses the information as to whether the vehicle is located in a road section or in a driving lane, whether or not bordering on an intersection, in order to narrow down the position of the vehicle. For example, if it is determined by means of the first sensor data that the vehicle is located in a road section or in a driving lane which borders on an intersection, all of the first edges which border on an intersection will be assigned a higher first probability than all other first edges.

In another advantageous modification, each time at least one driving lane is associated with at least one subset of the edges of the road network, corresponding to a driving lane of the road section respectively associated with the edge. The first probabilities are also determined on the basis of the driving lanes associated respectively with the first edges. In this modification, the number of driving lanes of a road section is used in order to narrow down the position of the vehicle. For example, if it is determined by means of the first sensor data that the vehicle is located on a road section having three driving lanes, all first edges having three driving lanes associated with them will be assigned a higher second probability than all other first edges.

In another advantageous modification, a probability is associated each time with each of the second edges on the basis of the second sensor data of each driving lane that the vehicle is located in the respective driving lane. The driving lane with the highest associated probability is determined as being part of the position of the vehicle. For example, if it is determined by means of the second sensor data that a traffic sign is located next to the vehicle on the right side, all second edges having a traffic sign of the same type as the traffic sign detected will be assigned a higher second probability than all other second edges.

For example, if it is determined by means of the second sensor data that a right and left side lane are located next to the vehicle, all second edges having a right and left side lane will be assigned a higher second probability than all other second edges.

The probability that the vehicle is located in the respective driving lane is determined in particular by using the probabilistic method. In particular, the driving lane can be determined by means of the image data of the camera of the sensor group of the vehicle. Determining the driving lane of the road section in which the vehicle is located allows a very precise position determination of the vehicle. This is important, for example, for autonomous driving systems or navigation systems.

In another advantageous modification, a probability is associated on the basis of the second sensor data for each possible driving direction of the vehicle that the vehicle is moving in the respective driving direction. The driving direction with the highest associated probability is determined as being part of the position of the vehicle. The probability that the vehicle is moving in the respective driving direction is determined in particular by using the probabilistic method. In particular, the driving direction can be determined by means of the odometer data, the egomotion data and/or from the time plot of the sensor coordinate of the vehicle. Determining the driving direction enables in particular a narrowing down of the position of the vehicle to particular edges. For example, only those edges can be selected that lie in the driving direction of the vehicle, based on a known position of the vehicle.

In another advantageous modification, at least one possible driving direction is associated each time with at least one subset of the edges of the road network. The second probabilities are also determined on the basis of the possible driving directions assigned to the second edges. For example, if the vehicle had to move against a possible driving direction in order to reach an edge, this edge is assigned a low probability. In this way, in particular, edges located behind the vehicle in the direction of travel are rejected.

In another advantageous modification, the probabilities associated with the first edges are compared each time to a minimum probability. Those first edges whose associated probabilities are larger than or equal to the minimum probability are determined as being the second edges. In this embodiment, a plurality of possible positions of the vehicle within the road network is determined. The minimum probability can either be predetermined or it can be determined for example on the basis of the first probabilities. The expense for determining the second probabilities can be greatly reduced thanks to the selection of the second edges, i.e., the limiting to the most probable position of the vehicle. Alternatively or additionally, the selection of the second edges can be done on the basis of the first sensor data or the second sensor data. For example, the edges of the road network can be determined as being the second edges lying in the direction of travel of the vehicle.

In another advantageous modification, the position of the vehicle is used as input of a system for autonomous driving of the vehicle and/or a driver assist system. Alternatively or additionally, the position is put out to a driver of the vehicle. For example, the position is indicated on a map.

Preferably the second probabilities are determined by using a probabilistic method, especially a Bayes filter. In this preferred embodiment, the first probabilities correspond to the probabilities $p(z_t|x)$ that the first sensor data $z_t$ detected at time t are detected under the assumption that the vehicle is located in the position x. The second probabilities correspond to the probabilities $p(y)$ that the vehicle at time t+1 is located in the position y.

The second probabilities are determined by means of a transition matrix $P_{t+1,y,t,x}$ and the first probabilities. The transition matrix is determined in particular on the basis of the egomotion data and/or the image data. Thus, for example, transitions to a position lying against the direction of travel of the vehicle are highly unlikely. Such transitions are also termed forbidden transitions. Further examples for forbidden transitions are a jumping from one road to another road, an entry to a road section against the permitted direction of travel, and an entry to a multilane highway via a driving lane not connected to a junction.

A further aspect of the invention relates to a device for determining a position of a vehicle in a road network. The road network has a plurality of edges, each being associated with a road section or a driving lane. The device comprises a sensor group, which is designed to detect first sensor data and second sensor data. The device further comprises a processor, which is designed to associate each edge of a plurality of first edges of the road network with a first probability on the basis of the first sensor data that the vehicle is located in the road section associated with the first edge or in the driving lane associated with the first edge and to associate a second probability with each edge of a plurality of second edges of the road network on the basis of the second sensor data and the probabilities associated with the first edges that the vehicle is located in the road section associated with the second edge or in the driving lane associated with the second edge. The plurality of second edges is at least a subset of the plurality of first edges. The processor is moreover adapted to determine the second edge with the highest associated probability to be the position of the vehicle.

The device has the same benefits as the claimed method and can be modified in the same way, especially with the features of the dependent claims.

BRIEF DESCRIPTION OF THE SEVERAL VIEWS OF THE DRAWINGS

Further features and benefits will emerge from the following description, explaining more closely embodiments in connection with the attached figures.

DETAILED DESCRIPTION

Figure 1:
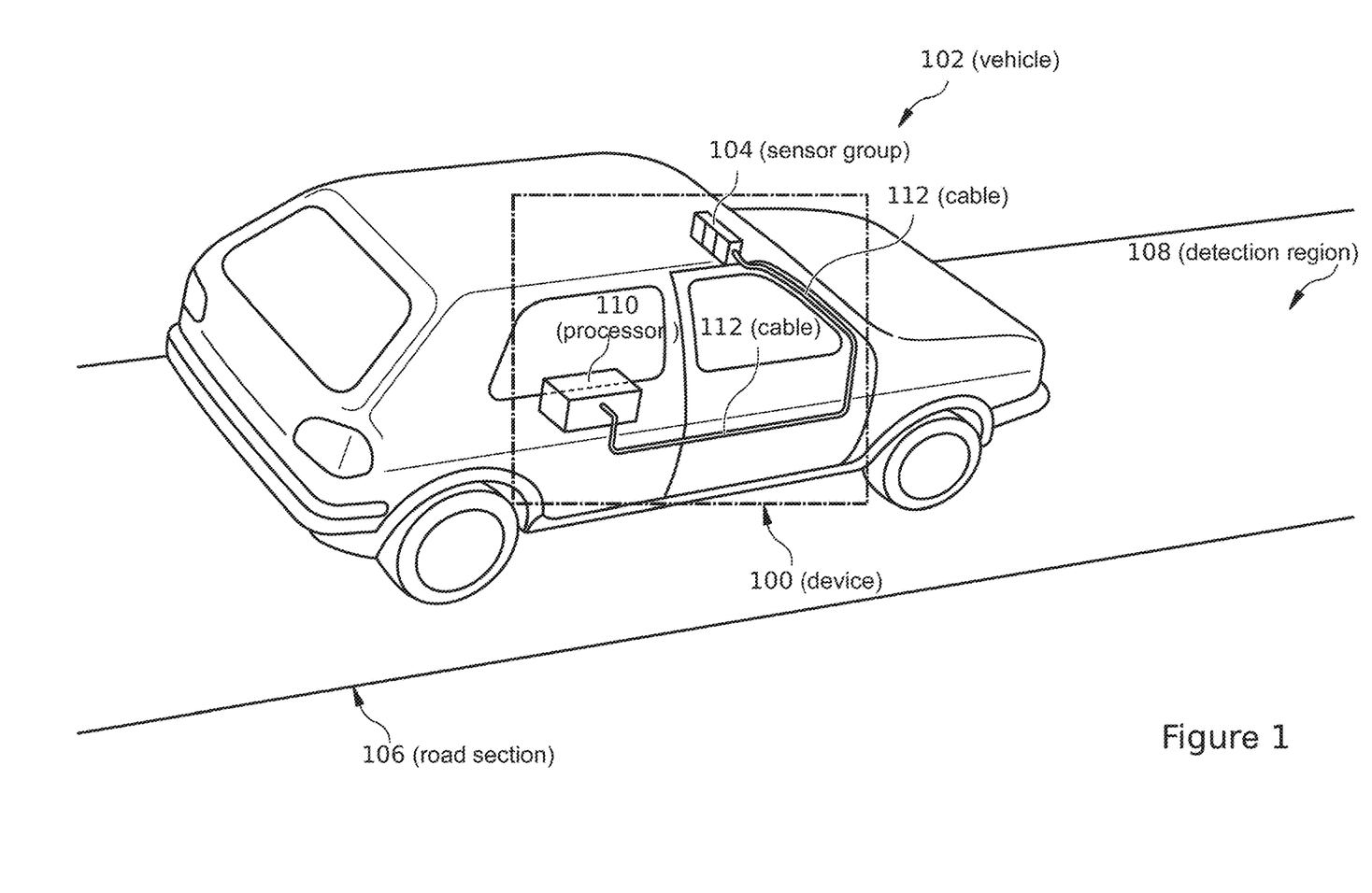
FIG. 1 shows a schematic representation of a device for determining a position of a vehicle in a road network.

FIG. 1 shows a schematic representation of a device 100 for determining a position of a vehicle 102 in a road network by means of a sensor group 104 of a vehicle 102.

The vehicle 102 is located in a road section 106, being associated with one edge of a plurality of edges of the road network and having for example a single driving lane. Each edge of the plurality of edges of the road network is associated respectively with a coordinate of the corresponding road section 106 in a global coordinate system.

The device 100 comprises the sensor group 104, which in the embodiment shown encompasses a camera, a receiver for a signal of a satellite navigation system, and an interface for the receiving of odometry data of the vehicle 102. The camera is oriented in the direction of travel of the vehicle 102 and is designed to register image data corresponding to an image of a detection region 108 in front of the vehicle 102. The receiver for the signal of the satellite navigation system is designed to determine a sensor coordinate 206 (see FIGS. 2 to 6) of the vehicle 102 in the global coordinate system. The interface for receiving of odometry data of the vehicle 102 is designed to receive odometry data, i.e., distance metering data, of the vehicle 102. The distance metering data comprise in particular a distance traveled in a particular period of time.

The device 100 moreover comprises a processor 110, which is connected to the sensor group 104 for example by means of a cable 112. The processor 110 is designed to determine, on the basis of the image data and/or by using a text recognition method and an object recognition method, whether a street name or part of a street name or another orientation point can be seen in the image of the detection region 108 of the camera and to further process this information as orientation point information. Furthermore, the processor 110 is designed to determine egomotion data on the basis of the image data and using an image processing method based on optical flow and to further process this. The processor 110 is moreover designed to determine the position of the vehicle 102 in the road network on the basis of the orientation point information, the egomotion data, and the sensor coordinate 206.

In order to determine the position of the vehicle 102, the processor 110 in a first step of the position determination compares the sensor coordinate 206 with the coordinates associated respectively with the edges of a plurality of first edges of the road network. The first edges may be a subset of all edges or they may be all edges of the road network. Under the assumption that the probability distribution of the actual position of the vehicle 102 is a normal distribution, the processor 110 assigns to each edge a first probability that the vehicle 102 is located in the road section 106 associated with the respective edge. The processor 110 then modifies the first probabilities on the basis of the orientation point information. For example, if a bridge is recognized in the image of the detection region 108, the processor 110 will adapt the first probabilities so that the first probability is decreased for all first edges not having a bridge associated with them as an orientation point.

In a second step of the position determination, which comes immediately after the first step in time, the processor 110 assigns a second probability to each edge of a plurality of second edges of the road network, on the basis of the egomotion data, the image data, the odometry data, and the probabilities assigned respectively to the first edges, and making use of a Bayes filter, that the vehicle 102 is located in the road section 106 associated with the second edge. The processor 110 then determines the second edge with the highest assigned probability to be the position of the vehicle 102.

The sequence of the method for determining the position of the vehicle 102 in the road network will be further explained in the following with the aid of FIGS. 2 to 6, each of them showing a segment 200 of the road network. The segment 200 comprises six edges 202a to 202f, each of them corresponding to a road section 106, and three nodes 204a to 204c, which join the edges 202a to 202f. Of the three nodes 204a to 204c, two nodes 204a, 204c join more than two of the edges 202a to 202f. These nodes 204a, 204c are also called intersections in the following. The segment 200 corresponds to a one-way street moving from left to right in FIGS. 2 to 6, being intersected respectively by another road 202f, 202f at two intersections 204a, 204c.

Figure 2:
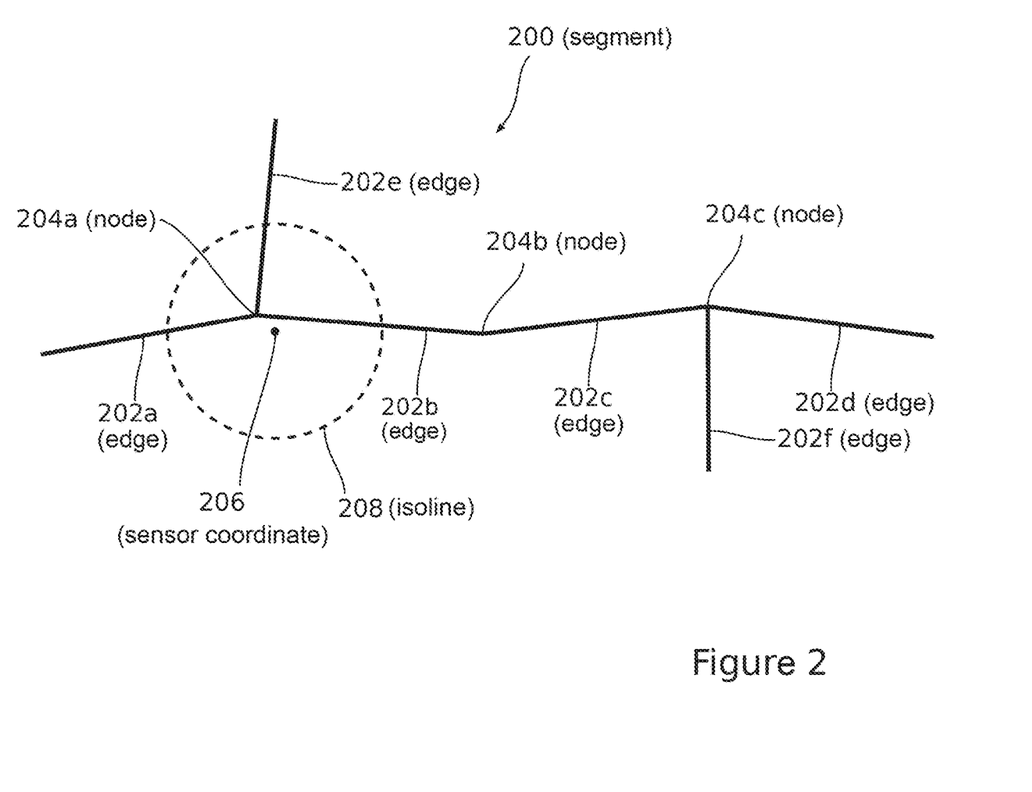
FIG. 2 shows a segment of the road network and the position of a sensor coordinate relative to the road network.

FIG. 2 shows the position of the sensor coordinate 206 relative to the road network as a point. The sensor coordinate 206 corresponds in the embodiment shown to the first sensor data and is fraught with a measurement error, which is assumed to have a normal distribution. For example, FIG. 2 shows an isoline 208 of the two-dimensional normal distribution of the measurement error as a dotted circle. The dotted circle covers at least partly the three edges 202a, 202b, 202f shown at extreme left in FIG. 2. This means that these three edges 202a, 202b, 202f are possible positions of the vehicle 102 within the measurement error of the sensor coordinate 206.

Figure 3:
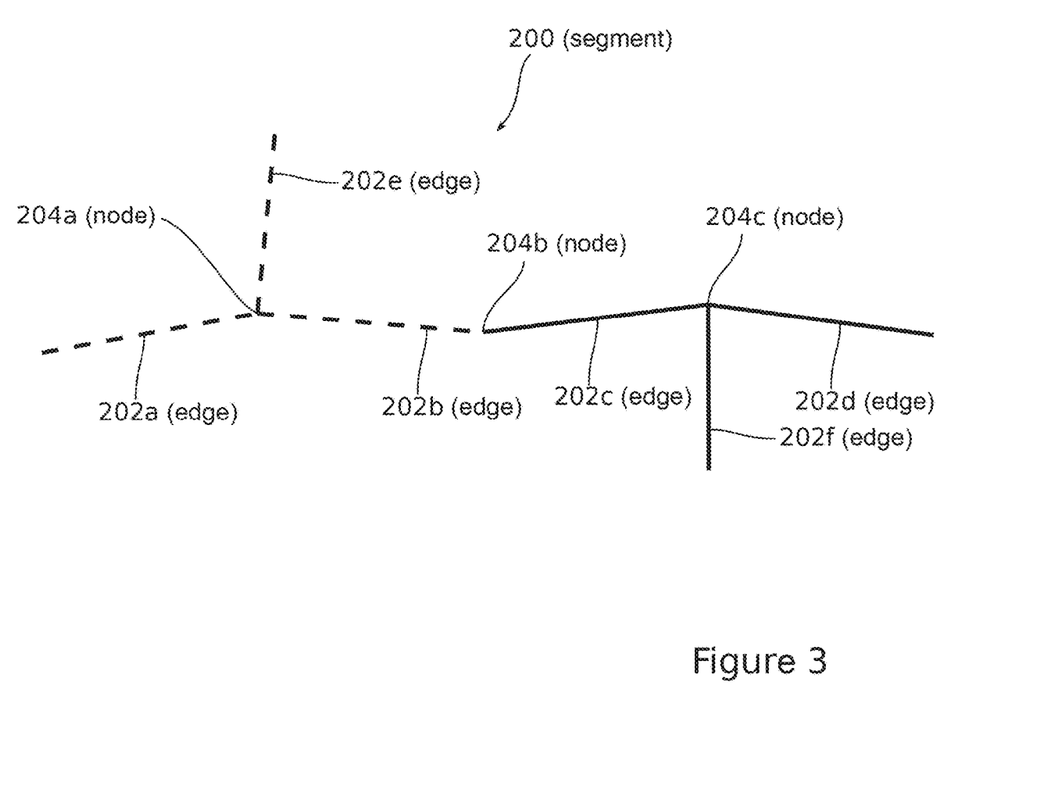
FIG. 3 shows the segment of the road network to illustrate a first step in the position determination.

FIG. 3 shows the segment 200 of the road network per FIG. 2. FIG. 3 illustrates the first step in the position determination per FIG. 1. All the edges 202a to 202f of the segment 200 of the road network shown in FIG. 3 are selected as the first edges. The three edges 202a, 202b, 202f lying within the measurement error of the sensor coordinate 206 are shown by broken line in FIG. 3. These three edges 202a, 202b, 202f are assigned a high first probability in the first step of the position determination. In other words: in the first step it is assumed that the vehicle 102 is most likely located in one of these three first edges 202a, 202b, 202f.

Figure 4:
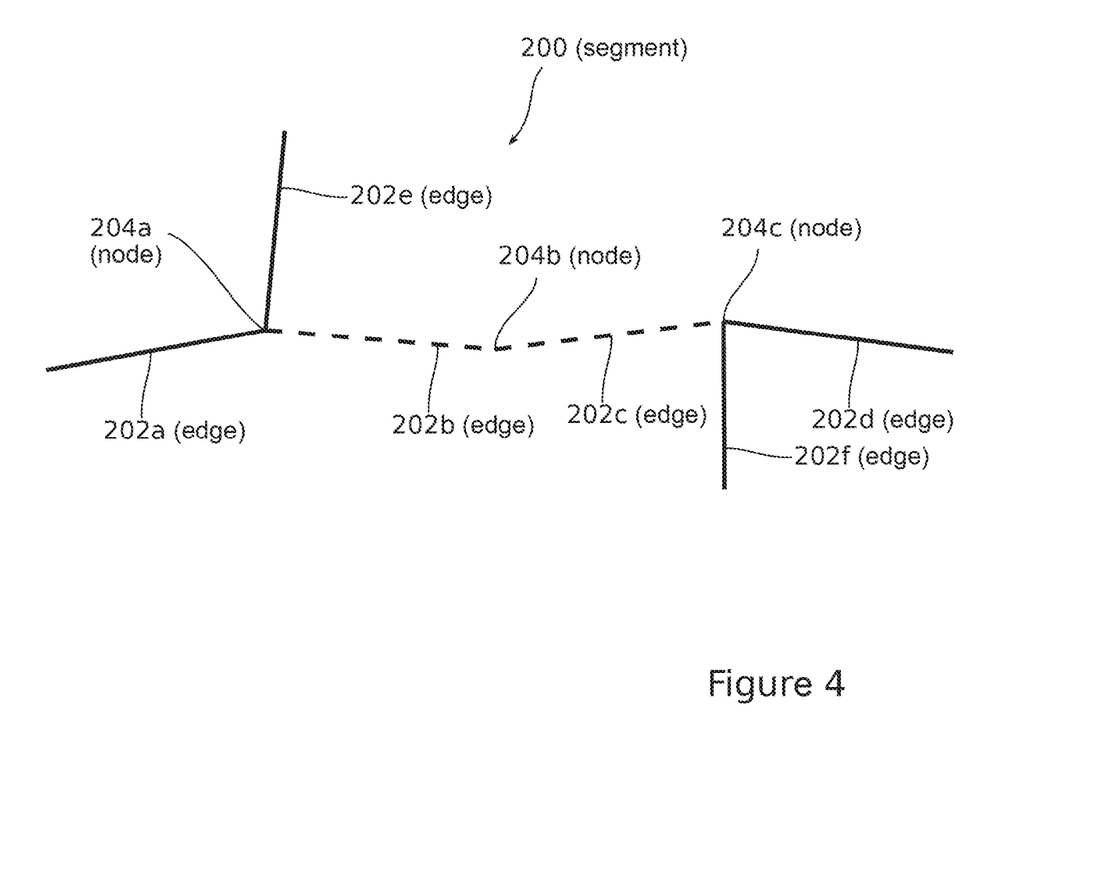
FIG. 4 shows the segment of the road network to illustrate a second step in the position determination.

FIG. 4 shows the segment 200 of the road network per FIG. 2 and illustrates the second step in the position determination per FIG. 1. In the second step, the second probabilities are determined by making use of the egomotion data, the odometry data, and the first probability assigned respectively to the first edges, using the Bayes filter. The egomotion data indicate that the vehicle 102 has moved forward in a particular direction, but no major change has taken place in the direction of travel. This precludes the vehicle 102 from being or having been located in the edge 202e emerging into the one-way street, for in this case the vehicle 102 would have had to turn off. Taking into account the odometry data and the fact that the vehicle 102 is located on a one-way street, the two edges 202b, 202c situated between the two intersections 204a, 204c can be assigned the highest second probability. These two second edges 202b, 202c are shown by broken line in FIG. 4.

Figure 5:
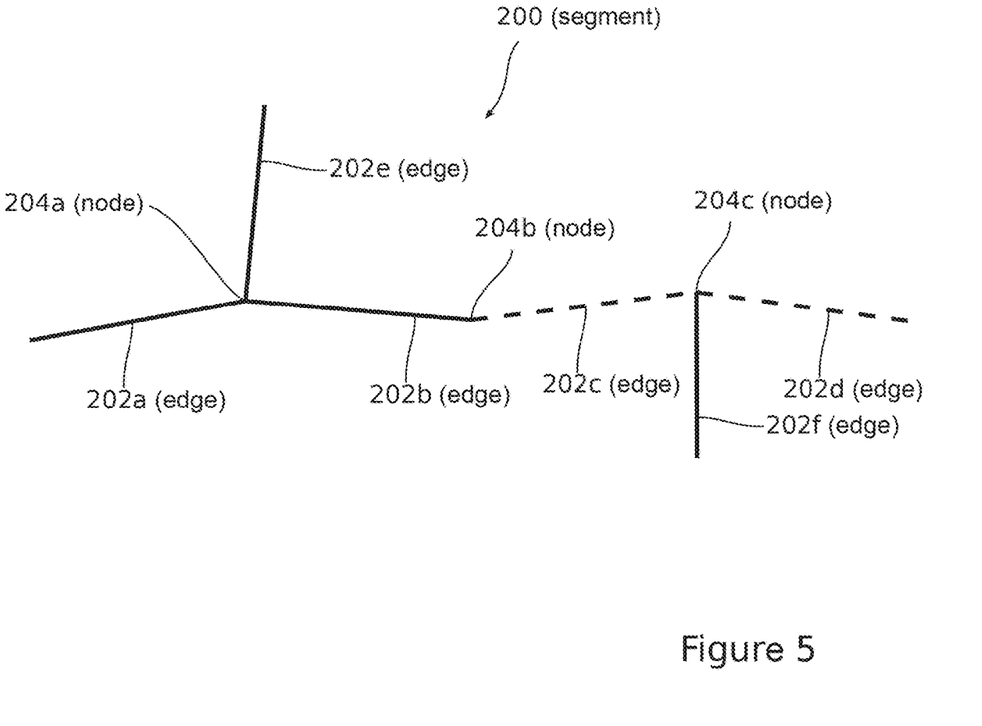
FIG. 5 shows the segment of the road network to illustrate a repetition of the second step in the position determination.

FIG. 5 shows the segment 200 of the road network per FIG. 2 and illustrates a first repetition of the second step in the position determination per FIG. 1. In the first repetition of the second step, new second probabilities are determined, making use of new egomotion data, new odometry data, and the second probability assigned respectively to the second edges 202b, 202c in the preceding second step, making use of the Bayes filter. The new egomotion data also indicate that the vehicle 102 has moved forward, but not turned off. Hence, the vehicle 102 cannot be located on the edge 202f leading to the one-way street, which is shown at right in FIG. 5. Taking into account the odometry data, the highest second probability can be assigned to the two edges 202c, 202d, which border on the intersection shown at right in FIG. 4. These two edges are shown by broken line in FIG. 5.

Figure 6:
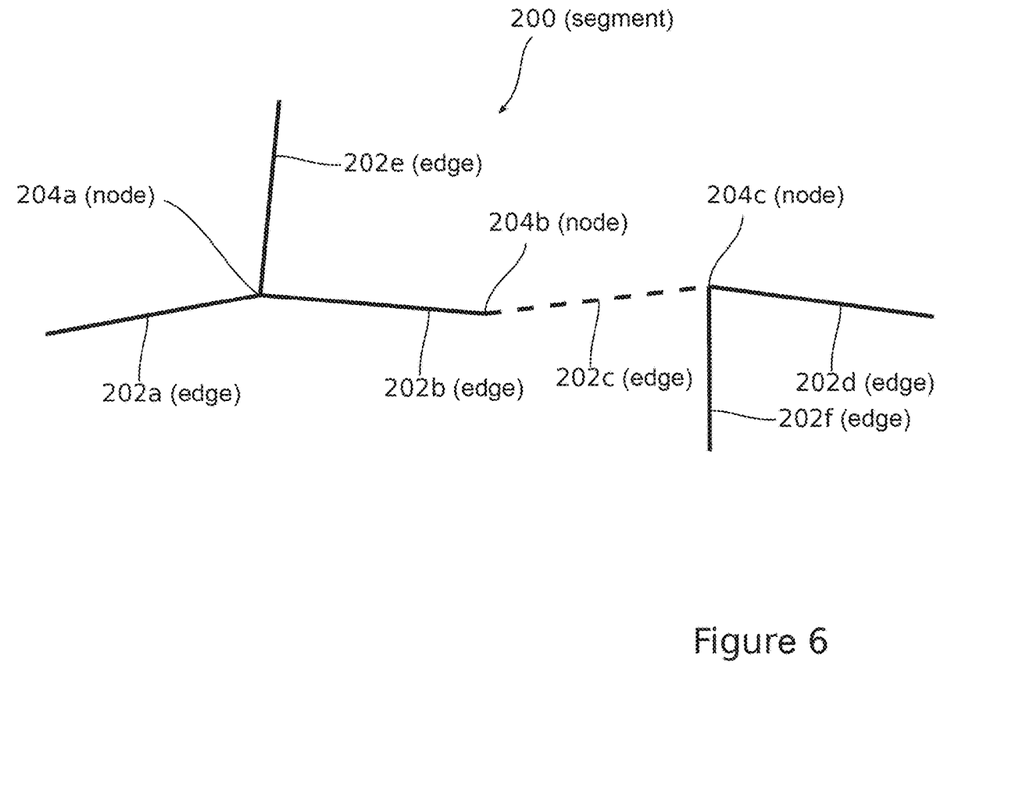
FIG. 6 shows the segment of the road network to illustrate a repetition of the second step in the position determination.

FIG. 6 shows the segment 200 of the road network per FIG. 2 and illustrates how the position determination per FIG. 5 can be improved on the basis of the image data. In the image of the detection region 108 of the camera, situated in front of the vehicle 102, there can be seen a traffic sign, which is associated with the edge 202f leading to the one-way street, shown at right in FIG. 5. The traffic sign is part of the orientation point information. Since the traffic sign can be seen in front of the vehicle 102, and taking into account the direction of travel of the vehicle 102 and the fact that the vehicle 102 is located on a one-way street, it can be ruled out that the vehicle 102 is located in the edge 202d, shown at far right in FIG. 6. Hence, the highest second probability can be assigned to a single edge. This second edge is shown by broken line in FIG. 6.

Figure 7:
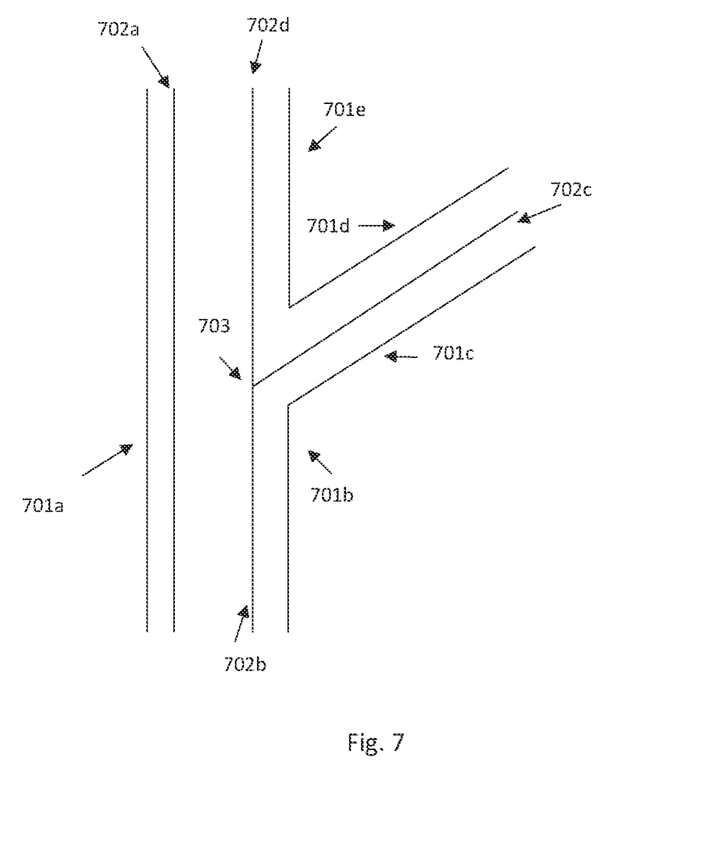
FIG. 7 shows an embodiment in which the edges of different driving lanes are associated with a road section.

FIG. 7 shows a preferred embodiment in which the edges 702a to 702d are associated with different driving lanes on a road section. The driving lanes are located within the road sections 701a to 701e. The driving lane 702a is not connected to the driving lanes 702b, 702c and 702d. The node 703 connects the driving lane 702b to the driving lane 702c and the driving lane 702d.

All the edges 702a to 202d of the segment 700 of the road network shown in FIG. 7 are selected as the first edges. In the first step of the position determination, a high first probability is assigned to the three edges 702b, 702c, 702d, which lie within the measurement error of the sensor coordinate 206. In other words: in the first step, it is assumed that the vehicle 102 is most likely located in one of these three first edges 702b, 202c, 702d.

In the second step, making use of the egomotion data, the odometry data, and the first probability assigned respectively to the first edges, and using the Bayes filter, the second probabilities are determined. The egomotion data indicate that the vehicle 102 has moved forward in a particular direction, but no major change has occurred in the direction of travel. This rules out the vehicle 102 being or having been in the merging edge 702c, for in this case the vehicle 102 would have had to turn off. Taking into account the odometry data and the fact that the vehicle 102 is located on a one-way street, the highest second probability can be assigned to the two edges 702b, 702d.

In the first repetition of the second step, new second probabilities are determined making use of new egomotion data, new odometry data, new image data and the second probability assigned respectively to the second edges 702b, 702d in the preceding second step, making use of the Bayes filter.

In the image of the detection region 108 of the camera located in front of the vehicle 102, there can be seen a traffic light, which is associated with the edge 702d. Since the traffic light is seen in front of the vehicle 102, and taking into consideration the direction of travel of the vehicle 102 and the fact that the vehicle 102 is located on a one-way street, it can be ruled out that the vehicle 102 is located in the edge 702b. Hence, the highest second probability can be assigned to a single edge (702d).

With the aid of FIGS. 1 to 7, the method according to the invention and the device 100 according to the invention are described in the example of one embodiment. In particular, the sensor group 104 may comprise further or other sensors not present in the embodiment shown. Examples of other sensors are a receiver for a mobile radio signal, a further camera which registers image data corresponding to an image of a detection region 108 behind the vehicle 102 and/or to the side of the vehicle 102, a radar or lidar sensor, as well as accelerometers or gyroscopes for detection of odometry data.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining a position of a vehicle in a road network having a plurality of edges, each of the edges being associated with one of a plurality of road sections or one of a plurality of driving lanes on one of the plurality of road sections, by a sensor group of the vehicle, the method comprising:
   detecting first sensor data by the sensor group,
   based on the first sensor data, associating each first edge of a plurality of first edges of the road network with a first probability among a plurality of first probabilities that the vehicle is located in a road section among the plurality of road sections associated with the first edge or in one of the plurality of driving lanes associated with the first edge,
   detecting second sensor data by the sensor group,
   based on the second sensor data and the first probabilities associated with the first edges, associating a second probability among a plurality of second probabilities with each second edge of a plurality of second edges of the road network that the vehicle is located in a road section among the plurality of road sections associated with the second edge or in one of the plurality of driving lanes associated with the second edge,
   determining that one of the second edges with a highest associated probability among the plurality of second probabilities is the position of the vehicle,
   determining a driving lane among the plurality of driving lanes in which the vehicle is located based on the position of the vehicle, and
   displaying an image of the vehicle in the driving lane.

2. The method according to claim 1, wherein a sensor coordinate of the vehicle is detected by a receiver for a signal of a satellite navigation system of the sensor group in a global coordinate system as at least part of the first sensor data and/or at least part of the second sensor data.

3. The method according to claim 2, wherein each of the plurality of edges of the road network is associated with a coordinate of a respectively associated road section in the global coordinate system, and the first probabilities are determined by comparing the sensor coordinate of the vehicle with at least a portion of coordinates associated respectively with the first edges.

4. The method according to claim 1, wherein image data are detected by a camera of the sensor group as at least part of the first sensor data and/or at least part of the second sensor data, the image data corresponding to an image of a detection region in front of or behind the vehicle.

5. The method according to claim 4, wherein an orientation point is associated with at least one subset of the edges of the road network, and based on the image data and making use of an object recognition method whether the orientation point is present in the detection region of the camera is determined, and if the orientation point is present in the detection region of the camera the first probabilities are determined based on the orientation point.

6. The method according to claim 4, wherein a landmark, including a traffic light or a traffic sign, is associated with at least one subset of the edges of the road network, and based on the image data whether the landmark is present in the image of the detection, region is determined, and if the landmark is present in the image of the detection region the second probabilities are determined based on the landmark.

7. The method according to claim 4, wherein at least a portion of the second sensor data are detected by the image data and/or egomotion data of the vehicle.

8. The method according to claim 1, wherein the road network contains a plurality of nodes, each of the nodes being associated with a junction between at least two road sections or between at least two driving lanes, where nodes associated with a junction between three or more road sections or between three of more driving lanes are called intersections, and based on the first sensor data or second sensor data whether the vehicle is located in a road section or in a driving lane bordering on an intersection is determined, or whether the vehicle is located in a road section or in a driving lane not bordering on an intersection, and wherein the first probabilities and the second probabilities are determined based on this information.

9. The method according to claim 1, wherein at least one driving lane is associated with at least one subset of the edges of the road network, corresponding to a driving lane of a road section respectively associated with one of the edges, and wherein the first probabilities and/or second probabilities are determined based on driving lanes associated respectively with the second edges.

10. The method according to claim 9, wherein a probability is associated with each of the second edges based on the second sensor data of each driving lane that the vehicle is located in the respective driving lane, and
wherein the driving lane with a highest associated probability is determined as being part of the position of the vehicle.

11. The method according to claim 1, wherein a probability is associated based on the second sensor data for each possible driving direction of the vehicle that the vehicle is moving in a respective driving direction, and
wherein the driving direction with a highest associated probability is determined as being part of the position of the vehicle.

12. The method according to claim 1, wherein at least one possible driving direction is associated with at least one subset of the edges of the road network, and the first probabilities are determined based on the possible driving directions assigned based on the first edges.

13. The method according to claim 1, wherein the probabilities associated with the first edges are compared to a minimum probability, and two or more of the first edges having associated probabilities are larger than or equal to the minimum probability are determined as being the second edges.

14. The method according to claim 1, wherein the second probabilities are determined by using a probabilistic method, especially a Bayes filter.

15. A device for determining a position of a vehicle in a road network having a plurality of edges, each of the edges being associated with one of a plurality of road sections or a driving lane, wherein the device comprises:
    a sensor group that, in operation, detects first sensor data and second sensor data; and
    a processor that, in operation,
        based on the first sensor data, associates each first edge of a plurality of first edges of the road network with a first probability among a plurality of first probabilities that the vehicle is located in a road section among the plurality of road sections associated with the first edge or in one of a plurality of driving lanes associated with the first edge,
        based on the second sensor data and the first probabilities associated with the first edges, associates a second probability among a plurality of second probabilities with each second edge of a plurality of second edges of the road network that the vehicle is located in the road section among the plurality of road sections associated with the second edge or in one of the plurality of driving lanes associated with the second edge,
        determines that one of the second edges with a highest associated probability among the plurality of second probabilities is the position of the vehicle,
        determines a driving lane among the plurality of driving lanes in which the vehicle is located based on the position of the vehicle, and
        displays an image of the vehicle in the driving lane.

* * * * *